(12) United States Patent
Jung et al.

(10) Patent No.: US 10,917,657 B2
(45) Date of Patent: Feb. 9, 2021

(54) METHOD FOR ENCODING AND DECODING IMAGES, DEVICE FOR ENCODING AND DECODING IMAGES, AND CORRESPONDING COMPUTER PROGRAMS

(71) Applicant: Orange, Paris (FR)

(72) Inventors: Joel Jung, Le Mesnil Saint-Denis (FR); Dang Khoa Vo Nguyen, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/319,792

(22) PCT Filed: Jun. 15, 2015

(86) PCT No.: PCT/FR2015/051577
§ 371 (c)(1),
(2) Date: Dec. 18, 2016

(87) PCT Pub. No.: WO2015/193599
PCT Pub. Date: Dec. 23, 2015

(65) Prior Publication Data
US 2017/0134744 A1    May 11, 2017

(30) Foreign Application Priority Data
Jun. 19, 2014   (FR) ..................................... 14 55666

(51) Int. Cl.
*H04N 19/52* (2014.01)
*H04N 19/139* (2014.01)
(Continued)

(52) U.S. Cl.
CPC ........... *H04N 19/52* (2014.11); *H04N 19/107* (2014.11); *H04N 19/139* (2014.11);
(Continued)

(58) Field of Classification Search
USPC .................................................... 375/240.16
See application file for complete search history.

(56) References Cited

U.S. PATENT DOCUMENTS

| 10,349,081 B2 * | 7/2019 | Nystrom ............... H04N 19/593 |
| 2003/0058347 A1 * | 3/2003 | Lee ......................... H04N 5/772 |
| | | 348/211.4 |

(Continued)

FOREIGN PATENT DOCUMENTS

EP    1921867 A1    5/2008

OTHER PUBLICATIONS

Wiegand, "Overview of the H.264 / AVC Video Coding Standard", IEEE Transactions on Circuits and Systems for Video Technology, Jul. 2003 (Year: 2003).*

(Continued)

*Primary Examiner* — Jamie J Atala
*Assistant Examiner* — Michael Robert Cammarata
(74) *Attorney, Agent, or Firm* — David D. Brush; Westman, Champlin & Koehler, P.A.

(57) ABSTRACT

A method is provided for encoding at least one current image. The method implements, at an image capturing terminal, for at least one portion to be encoded of the current image: determining a piece of information related to manipulation of the terminal by a user, in relation with the at least one captured current image; obtaining at least one piece of data related to the current image by transforming the determined piece of information; and from the obtained piece of data, implementing at least one of the following acts: predicting a piece of movement information associated with the at least one portion of the current image, and determining at least one characteristic of an encoding mode associated with the at least one portion of the current image.

12 Claims, 5 Drawing Sheets

(51) Int. Cl.
| | |
|---|---|
| *H04N 19/46* | (2014.01) |
| *H04N 19/162* | (2014.01) |
| *H04N 19/61* | (2014.01) |
| *H04N 19/51* | (2014.01) |
| *H04N 19/523* | (2014.01) |
| *H04N 19/107* | (2014.01) |
| *H04N 19/82* | (2014.01) |

(52) U.S. Cl.
CPC ........... *H04N 19/162* (2014.11); *H04N 19/46* (2014.11); *H04N 19/51* (2014.11); *H04N 19/523* (2014.11); *H04N 19/61* (2014.11); *H04N 19/82* (2014.11)

(56) References Cited

U.S. PATENT DOCUMENTS

| | | | | |
|---|---|---|---|---|
| 2006/0209953 | A1* | 9/2006 | Jung | H04N 19/105 375/240.12 |
| 2009/0086814 | A1* | 4/2009 | Leontaris | H04N 19/105 375/240.02 |
| 2009/0290645 | A1* | 11/2009 | Mabey | H04N 5/23203 375/240.25 |
| 2010/0020244 | A1* | 1/2010 | Mitsuya | H04N 5/23248 348/699 |
| 2010/0079605 | A1* | 4/2010 | Wang | H04N 5/225 348/208.4 |
| 2011/0038416 | A1* | 2/2011 | Zhou | H04N 19/176 375/240.13 |
| 2011/0109753 | A1* | 5/2011 | Srinivasamurthy | H04N 19/85 348/208.4 |
| 2011/0206124 | A1* | 8/2011 | Morphet | H04N 5/145 375/240.16 |
| 2012/0163472 | A1* | 6/2012 | Sole Rojals | H04N 19/176 375/240.24 |
| 2012/0169890 | A1* | 7/2012 | Tian | H04N 5/145 348/207.11 |
| 2013/0003845 | A1* | 1/2013 | Zhou | H04N 19/197 375/240.16 |
| 2014/0078394 | A1* | 3/2014 | Lou | H04N 11/20 348/453 |
| 2014/0192862 | A1* | 7/2014 | Flynn | H04N 19/00569 375/240.03 |
| 2017/0134744 | A1* | 5/2017 | Jung | H04N 19/52 |
| 2018/0032303 | A1* | 2/2018 | Lee | G06T 1/20 |

OTHER PUBLICATIONS

International Search Report dated Sep. 10, 2015, for corresponding International Application No. PCT/FR2015/051577, filed Jun. 15, 2015.

Written Opinion of the International Searching Authority dated Sep. 10, 2015, for corresponding International Application No. PCT/FR2015/051577, filed Jun. 15, 2015.

Puri et al., "Video Coding Using the H.264/MPEG-4 AVC Compression Standard", Signal Processing. Image Communication, Elsevier Science Publishers, Amsterdam, NL, vol. 19. No. 9, Oct. 1, 2004, pp. 793-849, XP004607150.

English translation of the Written Opinion of the International Searching Authority dated Sep. 10, 2015, for corresponding International Application No. PCT/FR2015/051577, filed Jun. 15, 2015.

\* cited by examiner

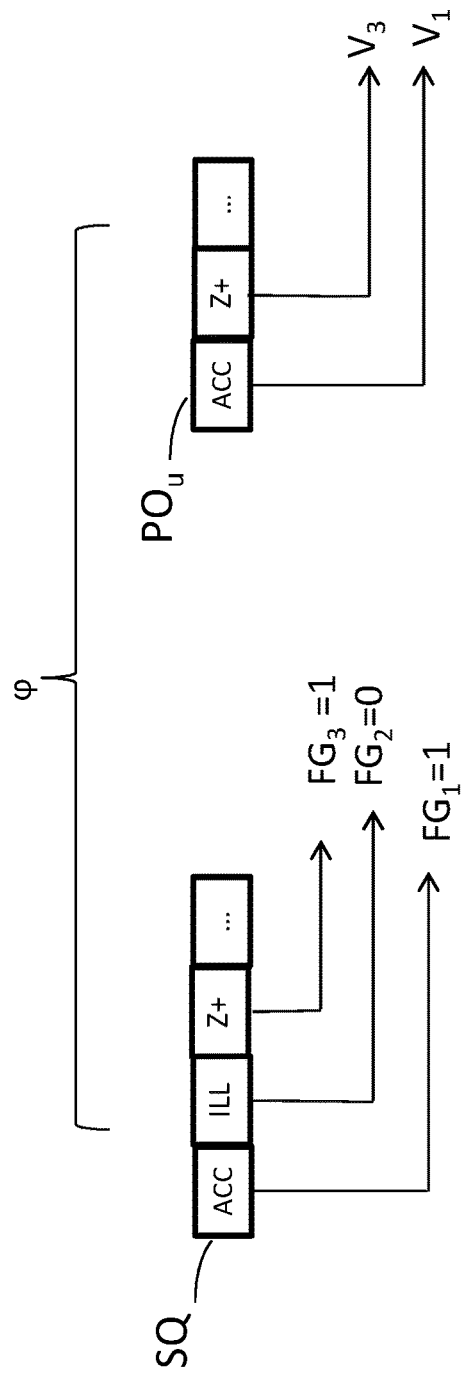
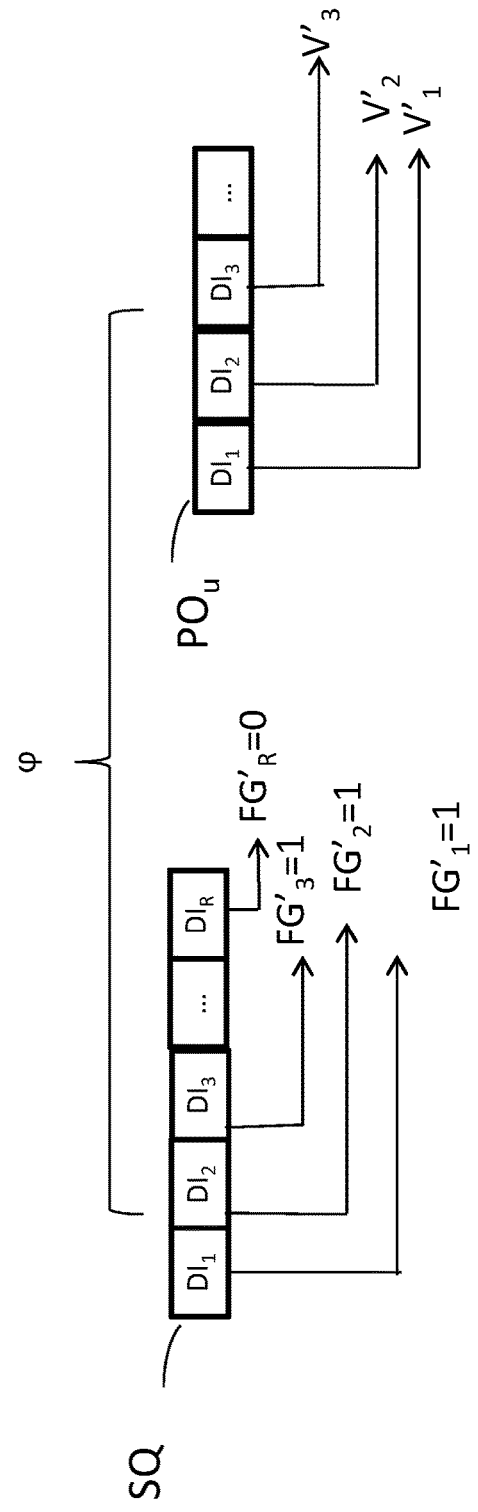
FIG.3A
FIG.3B

METHOD FOR ENCODING AND DECODING IMAGES, DEVICE FOR ENCODING AND DECODING IMAGES, AND CORRESPONDING COMPUTER PROGRAMS

CROSS-REFERENCE TO RELATED APPLICATIONS

This application is a Section 371 National Stage application of International Application No. PCT/FR2015/051577, filed Jun. 15, 2015, which is incorporated by reference in its entirety and published as WO 2015/193599 on Dec. 23, 2015, not in English.

FIELD OF THE INVENTION

The present invention relates generally to the field of image processing, and more specifically to the coding and the decoding of digital images and of sequences of digital images.

The coding/decoding of digital images applies in particular to images deriving from at least one video sequence comprising:
  images deriving from one and the same camera and following one another in time (2D-type coding/decoding),
  images deriving from different cameras oriented according to different views (3D-type coding/decoding),
  corresponding texture and depth components (3D-type coding/decoding),
  etc.

The present invention applies similarly to the coding/decoding of 2D- or 3D-type images.

The invention can notably, but not exclusively, be applied to the video coding implemented in the current video coders such as, for example, AVC, HEVC and their extensions (MVC, 3D-AVC, MV-HEVC, 3D-HEVC, etc.) and to the corresponding decoding.

PRIOR ART

Images and sequences of digital images occupy a lot of space in terms of memory, which necessitates, when these images are transmitted, them being compressed in order to avoid the problems of congestion on the communication network used for this transmission, the usable bit rate on the latter being generally limited. This compression is also desirable with a view to the storage of these data.

Numerous video data compression techniques are already known. For example, in the current video coders of HEVC type, it is proposed, for a video sequence concerned, to:
  subdivide into coding units each image of the video sequence, said coding units being likely to be re-subdivided into blocks recursively,
  code each coding unit in accordance with a selected coding mode, such as the intra or inter mode in particular.

Thus, in the intra coding mode, certain images of the video sequence are coded by spatial prediction, whereas, in the inter coding mode, other images are coded by time prediction relative to one or more coded-decoded reference images, using a motion compensation known to those skilled in the art.

After this predictive coding, the residual coding units are transformed by an operation of discrete cosine transform (DCT) type, then quantized. The coefficients of the quantized residual coding units are then scanned in a predetermined reading order making it possible to exploit the large number of null coefficients in the high frequencies, then coded by entropic coding. In the HEVC standard, for example, one coding mode proposed is to impose a single possible reading order which is the "raster-scan" order, the latter beginning from the first block situated in the top left of the coding unit concerned and ending at the last block situated in the bottom right of that unit.

When a coding unit is divided into blocks, a data signal, corresponding to each block, is transmitted to the decoder. Such a signal comprises:
  residual data which are the coefficients of the quantized residual blocks and, possibly, in a coding in inter mode, residual motion vector data,
  coding parameters which are representative of the coding mode used, in particular:
    the prediction type (intra prediction, inter prediction, default prediction producing a prediction for which no information item is transmitted to the decoder (skip));
    information items specifying the type of prediction (orientation, reference image, etc.);
    the type of partitioning;
    the type of transform, for example 4×4 DCT, 8×8 DCT, etc.;
    motion information items if necessary;
    etc.

The decoding is then implemented image by image, and for each image, coding unit by coding unit. For each block of a coding unit, the corresponding elements of the signal are read. The inverse quantization and the inverse transformation of the coefficients of the blocks are performed. Then, the prediction of a block concerned is computed and the block is reconstructed by adding the prediction to the decoded prediction residue.

The competition-based intra or inter coding thus relies on the competing of different coding parameters, such as those mentioned above, in order to select the best coding mode, that is to say that which will optimize the coding of the block concerned according to a predetermined performance criterion, for example the bit rate/distortion cost well known to those skilled in the art.

The coding parameters relating to the selected coding mode are contained in the data signal transmitted by the coder to the decoder, in the form of identifiers, generally called competition indices. The decoder is thus capable of identifying the coding mode selected on the coder, then of applying the prediction in accordance with this mode.

The bandwidth allocated to these competition indices is not negligible, since it reaches at least approximately 30%. Moreover, it tends to increase because of the ever-growing input of new coding parameters such as new block dimensions, new block forms, new intra prediction parameters, etc.

Moreover, the video coders/decoders of the abovementioned type are installed in image capture terminals such as, for example, a portable telephone, a smartphone, a tablet, etc.

Today, these terminals are mostly provided with different data sensors, such as, for example, an accelerometer, a gyroscope, a magnetometer, which make it possible to detect any change of behavior of the terminals, when the user manipulates them, and in response to generate one or more actions on the part of these terminals, without any particular intervention from the user.

In addition to the abovementioned sensors, the current terminals contain many interfaces (e.g. touch buttons) which allow the user to actuate particular functionalities offered by these terminals, upon the capture of an image or of a video. The "zoom in", "zoom out" button constitutes one example of these interfaces.

The data supplied by such sensors or such interfaces are currently advantageously exploited to reduce the complexity of the video coding.

However, the exploitation of these data does not currently make it possible to improve the coding/decoding performance levels and reduce the signaling cost of the coded data in the signal to be transmitted to the decoder.

SUMMARY OF THE INVENTION

An exemplary embodiment of the present invention relates to a method for coding at least one current image, such a method being noteworthy in that it implements, on an image capture terminal, for at least one portion to be coded of the current image, the steps consisting in:
  determining an information item relating to the manipulation of the terminal by a user, in relation to the captured current image,
  obtaining at least one datum relating to the current image by transformation of the determined information item,
  from the datum obtained, implementing at least one of the following steps:
    predicting a motion information item associated with the at least one portion of the current image,
    determining at least one characteristic of a coding mode associated with the at least one portion of the current image.

Such an arrangement thus makes it possible, in a competition-based coding, whether the latter is in accordance with an intra, inter or other mode, to avoid including, in the signal to be transmitted to the decoder, the competition index or indices computed after the competing of multiple coding parameters. Only the information item relating to the manipulation of the terminal by the user, raw or else transformed, needs to be transmitted in the data signal to the decoder.

The result thereof is thus a not-inconsiderable reduction of the signaling cost, inasmuch as such an arrangement is reproducible on the decoder.

Another aim of such an arrangement is to advantageously exploit the information items relating to the manipulation of the terminal by the user, either to refine the prediction of the motion information items in the context of an inter-based image coding, or to improve the coding performance levels by refining the selection of the optimal coding mode. Such exploitation consists in transforming these information items into image data so that the latter are directly comprehensible by the coder.

The expression "information item relating to the manipulation of the terminal by a user, in relation to the captured current image" should be understood to mean any datum delivered as output from a sensor installed in the image capture terminal, such as, in particular:
  a tangential and centripetal acceleration measured by an accelerometer,
  an angular velocity measured by a gyroscope,
  a magnetic field variation measured by a magnetometer,
  an illumination measured by an illumination sensor,
  etc.

The expression "information item relating to the manipulation of the terminal by a user, in relation to the captured current image" should also be understood to mean:
  any displacement, acceleration, etc. of the image capture terminal performed on the initiative of the user when the latter captures an image,
  a datum resulting from the interaction of the user on the captured current image by means of a control interface, such as, for example, a button of the terminal.

According to a first exemplary datum resulting from the interaction of the user on the captured current image by means of a control interface, such an information item relating to the manipulation of the terminal by a user consists of the pixels of an image, transformed following a homography implemented in the case where the user selects the "zoom in" or "zoom out" button of his or her terminal to respectively enlarge or shrink the displayed current image.

According to a second exemplary datum resulting from the interaction of the user on the captured current image by means of a control interface, such an information item relating to the manipulation of the terminal by a user consists of the pixels of an image, having undergone a transformation following a homography implemented in the case where the user selects the "panoramic" button of his or her terminal to view the displayed current image in panoramic form.

According to a third exemplary datum resulting from the interaction of the user on the captured current image by means of a control interface, such an information item relating to the manipulation of the terminal by a user consists of the pixels of an image, transformed following a rotation implemented in the case where the user selects the "rotation" button of his or her terminal to swivel the current image displayed in the clockwise or counter-clockwise direction.

As for the various displacements, acceleration, etc. of the image capture terminal which are performed by the user, they are measured by the abovementioned sensors.

Within the meaning of the invention, a "motion information item associated with a portion of the current image" should be understood to mean a motion vector, in the case of a simple linear motion such as a translation, or else even a matrix of motion vectors in the case of a more complex motion such as a rotation, a homography, etc.

Within the meaning of the invention, a portion of the current image is for example a particular area of the image. If, for example, the image represents a beach, a first area of the image is the sky and the second area of the image is the sand.

According to another example, a portion of the current image is a coding unit as defined in the HEVC standard.

Thus, the coding method offers the advantage of being able to be adapted to coders of different standards.

According to a particular embodiment, the coding method further comprises the steps consisting in:
  generating a data signal containing the encoded data of the portion of the current image,
  inserting into the data signal either the information item relating to the manipulation of the terminal, or the datum relating to the current image which has been obtained by transformation of the information item relating to the manipulation of the terminal.

In the case where such a data signal is transmitted to the decoder, the direct insertion into the signal of the information item relating to the manipulation of the terminal requires the decoder to perform a transformation of this information item to correspondingly obtain a datum relating to the current image. Such an arrangement is advantageous when the transformed datum is costly to transmit. Moreover, such an arrangement advantageously allows the decoder to determine by itself a variation of motion between two successive images, just like the characteristics (translation, rotation, homography, etc.) of this variation, without the coder having to transmit to it more information items on such a variation.

In the case where such a data signal is transmitted to the decoder, the insertion into the signal of the datum relating to the current image which has been obtained by transformation of the information item relating to the manipulation of the terminal allows the decoder to directly read, in the signal received, this datum which is immediately comprehensible by the latter.

The invention relates also to a device for coding at least one current image which can be installed in an image capture terminal, such a device being noteworthy in that it comprises, for at least one portion to be coded of the current image, a processing module capable of:
- determining an information item relating to the manipulation of the terminal by a user, in relation to said at least one captured image,
- obtaining at least one datum relating to the current image by transformation of said determined datum,
- from said datum obtained, implementing at least one of the following steps:
  - triggering the activation of a module for predicting a motion information item associated with said at least one portion of the current image,
  - determining at least one characteristic of a coding mode associated with said at least one portion of the current image.

Such a coding device is notably suitable for implementing the abovementioned coding method.

In particular, such a coding device can be installed in an image capture terminal such as, for example, a portable telephone, a smartphone, a tablet, etc.

In a manner corresponding to the abovementioned coding method, the invention relates to a method for decoding a data signal representative of at least one current image, such a decoding method being noteworthy in that it implements, on an image display terminal, for at least one portion to be reconstructed of the current image, the steps consisting in:
- identifying, in the signal, either an information item relating to the manipulation of the terminal by a user, in relation to the captured current image, or a datum relating to the current image obtained previously by transformation of the information item relating to the manipulation of the terminal,
- if it is an information item relating to the manipulation of the terminal which is identified, determining at least one datum relating to the current image by transformation of the identified information item,
- from the datum relating to the current image identified in the signal or else determined by transformation of the information item identified in the signal, implementing at least one of the following steps:
  - reconstructing, by motion prediction, a motion information item associated with the at least one portion of the current image,
  - determining at least one characteristic of a decoding mode associated with the at least one portion of the current image.

According to a particular embodiment, the datum relating to the determined current image is a motion information item associated with the current image.

Such an arrangement allows the decoder to determine, by virtue of an information item relating to the manipulation of the terminal by the user concerning the capture of the current image, a motion information item which is associated with the current image portion to be reconstructed, as follows:
- either directly in the data signal if the motion information item has been obtained following the coding by transformation of the information item relating to the manipulation of the terminal,
- or from the raw information item relating to the manipulation of the terminal transmitted per se in the data signal.

A "motion information item associated with the current image" should be understood to mean a motion vector, in the case of a simple linear motion such as a translation, or else a matrix of motion vectors in the case of a more complex motion such as a rotation, a homography, etc.

According to another particular embodiment, during the step of reconstruction of the motion information item associated with the portion of the current image, the motion information item associated with the current image is selected as motion information item predictive of the motion information item associated with the current image portion or else as motion information item from which the motion information item associated with the current image portion inherits.

Such an arrangement advantageously allows the decoder to exploit an information item relating to the manipulation of the terminal in order to implement the prediction or the inheritance of a current motion information item without needing to read, in the signal, the index of this information item and the index of the reference image associated with this information item.

Depending on the type of coding which has been implemented, the prediction of the motion information item implemented in the decoding possibly requires the reading, in the signal received from the coder, of residual data of this motion information item.

According to yet another particular embodiment, during the step of reconstruction of the motion information item associated with the portion of the current image:
- either a motion information item predictive of the motion information item associated with the portion of the current image is selected in a list of candidate predictive motion information items, to which has previously been added the motion information item associated with the current image,
- or a motion information item from which the motion information item associated with the portion of the current image inherits is selected in a list of motion information items that are candidates for inheritance, to which has previously been added the motion information item associated with the current image.

Such an arrangement advantageously allows the decoder to exploit an information item relating to the manipulation of the terminal in order to independently determine a predictive or inheritance motion information item intended to be added to the list of existing predictive or inheritance motion information items, such as, for example, the list of motion vectors of the AMVP (Advanced Motion Vector Prediction) decoding mode or else the list of motion vectors of the Merge decoding mode, both well known in the HEVC standard.

Thus, the decoder benefits from a greater choice of predictive or inheritance motion information items, which enables it to select the motion information item best suited to the prediction or the inheritance of the motion of the current image portion, while making it possible to save on computation resources in the coding/decoding.

According to yet another particular embodiment, the at least one characteristic of the decoding mode for the portion of the current image is an accuracy of the motion of the current image portion determined in accordance with a value of accuracy of the motion of the current image having been previously associated with a value of the motion information item of the current image.

Such an arrangement advantageously allows the decoder to exploit an information item relating to the manipulation of the terminal in order to independently determine whether, for a coding mode conventionally signaled by the coder, for example the inter mode, the resolution of the motion of the captured image has been modified or not in relation to the preceding image. The indication of such a modification of resolution does not thus need to be transmitted in the data signal originating from the coder since the decoder itself knows how to interpret the information item relating to the manipulation of the terminal by a motion resolution of a given value, such as, for example, by a motion resolution to within a $16^{th}$ of a pixel, to within an $8^{th}$ of a pixel, etc., to within a pixel.

According to yet another particular embodiment, the at least one characteristic of the decoding mode for the portion of the current image is a type of motion of the portion of the current image determined in accordance with motion parameters of the current image which have been previously associated with the datum relating to the current image identified in the signal or else determined by transformation of the information item identified in the signal.

Such an arrangement advantageously allows the decoder to exploit an information item relating to the manipulation of the terminal, in order to independently determine, for a coding mode signaled conventionally by the coder, for example the inter mode, the type of motion of the captured image, such as, for example, linear, affine, homographic, etc. The indication of the type of motion does not thus need to be transmitted in the data signal originating from the coder since the decoder itself knows how to interpret the information item relating to the manipulation of the terminal as a given type of motion.

According to yet another particular embodiment, the at least one characteristic of the decoding mode for the portion of the current image is an order for decoding of the pixels of the portion of the current image determined in accordance with a type of order for decoding of the pixels of the current image which has been previously associated with the datum relating to the current image identified in the signal or else determined by transformation of the information item identified in the signal.

Such an arrangement advantageously allows the decoder to exploit an information item relating to the manipulation of the terminal in order to independently determine whether, for a coding mode signaled conventionally by the coder, for example the mode of reading of the portions of the current image which has been used, the order of coding of the pixels of the current image portion has been modified or not, in order to apply the corresponding decoding order to reconstruct the pixels of the current image portion. The indication of such a modification of the coding order and of the different possible coding orders does not thus need to be transmitted in the data signal originating from the coder since the decoder itself knows how to interpret the information item relating to the manipulation of the terminal as a given type of decoding order to be applied.

According to yet another particular embodiment, the at least one characteristic of the decoding mode for the portion of the current image is a direction of prediction of the pixels of the portion of the current image determined in accordance with an angle value between the current image and an image preceding said current image, such an angle value having been previously associated with the datum relating to the current image identified in the signal or else determined by transformation of the information item identified in the signal.

Such an arrangement advantageously allows the decoder to exploit an information item relating to the manipulation of the terminal in order to independently determine, for a coding mode signaled conventionally by the coder, for example the intra mode, the direction of prediction of the pixels of the current image portion to be reconstructed, without the coder needing to indicate in the signal all of the different possible prediction directions.

According to yet another particular embodiment, the at least one characteristic of the decoding mode for the portion of the current image is an indicator of activation or of non-activation of a module for filtering the pixels of the portion of the current image determined as a function of a brightness value of the current image which has been previously associated with the datum relating to the current image identified in the signal or else determined by transformation of the information item identified in the signal.

Such an arrangement advantageously allows the decoder to exploit an information item relating to the manipulation of the terminal in order to independently determine whether, for a coding mode signaled conventionally by the coder, for example the intra mode, a module for filtering the pixels of the current image portion to be reconstructed should or should not be activated. Thus, for example, in the case where the information item relating to the manipulation of the terminal is an acceleration measured by an accelerometer and the value of this acceleration is high, the decoder directly deduces therefrom that an anti-block or de-blocking filter should be activated. According to another example, in the case where the information item relating to the manipulation of the terminal is an illumination measured by an illumination sensor and the value of this illumination is low, thereby characterizing a dark area of the image, the decoder directly deduces therefrom that a noise-reduction filter should be activated.

The various embodiments or features mentioned above can be added independently to or in combination with one another, in the steps of the decoding method defined above.

Correspondingly, the invention relates also to a device for decoding a data signal representative of at least one current image, such a device being able to be installed in an image display terminal.

Such a decoding device is noteworthy in that it comprises, for at least one portion to be reconstructed of the current image:
  a reading module capable of identifying, in the signal, either an information item relating to the manipulation of the terminal by a user, in relation to the captured current image, or a datum relating to the current image obtained previously by transformation of the information item relating to the manipulation of the terminal,
  a processing module capable of:
    determining, if it is an information item relating to the manipulation of the terminal which is identified, at least one datum relating to the current image by transformation of the identified information item,
    from the datum relating to the current image identified in the signal or else determined by transformation of the information item identified in the signal, implementing at least one of the following steps:
      triggering the activation of a motion prediction module in order to reconstruct, by motion prediction, a motion information item associated with the at least one portion of the current image, determining at least one characteristic of a decoding mode associated with the at least one portion of the current image.

Such a decoding device is notably suitable for implementing the abovementioned decoding method.

In particular, such a decoding device can be installed in an image display terminal such as, for example, a television receiver, a portable telephone, a smartphone, a tablet, etc.

The invention also relates to a computer program comprising instructions for implementing the coding method or the decoding method according to the invention, when it is run on a computer.

This program can use any programming language, and be in the form of source code, object code, or intermediate code between source code and object code, such as in a partially compiled form, or in any other desirable form.

The invention also targets a computer-readable storage medium on which is stored a computer program, this program comprising instructions suitable for implementing the coding method or the decoding method according to the invention, as described above.

Such a storage medium can be any entity or device capable of storing the program. For example, the medium can comprise a storage means, such as a ROM, for example a CD ROM or a microelectronic circuit ROM, or even a magnetic storage means, for example a USB key or a hard disk.

Also, such a storage medium can be a transmissible medium such as an electrical or optical signal, which can be routed via an electrical or optical cable, wirelessly or by other means. The program according to the invention can in particular be downloaded over a network of Internet type.

Alternatively, the storage medium can be an integrated circuit in which the program is incorporated, the circuit being adapted to execute or be used in the execution of the abovementioned coding or decoding method.

BRIEF DESCRIPTION OF THE DRAWINGS

Other features and advantages will become apparent on reading a preferred embodiment described with reference to the figures in which:

FIG. 3A represents a first example of the structure of the signal delivered by the coding device of FIG. 2, FIG. 3B represents a second example of the structure of the signal delivered by the coding device of FIG. 2.

DETAILED DESCRIPTION OF THE CODING PART

An embodiment of the invention will now be described, in which the coding method according to the invention is used to code an image or a sequence of images according to a binary signal similar to that obtained by a coding implemented in a coder conforming to any one of the current or future video coding standards.

Figure 1:
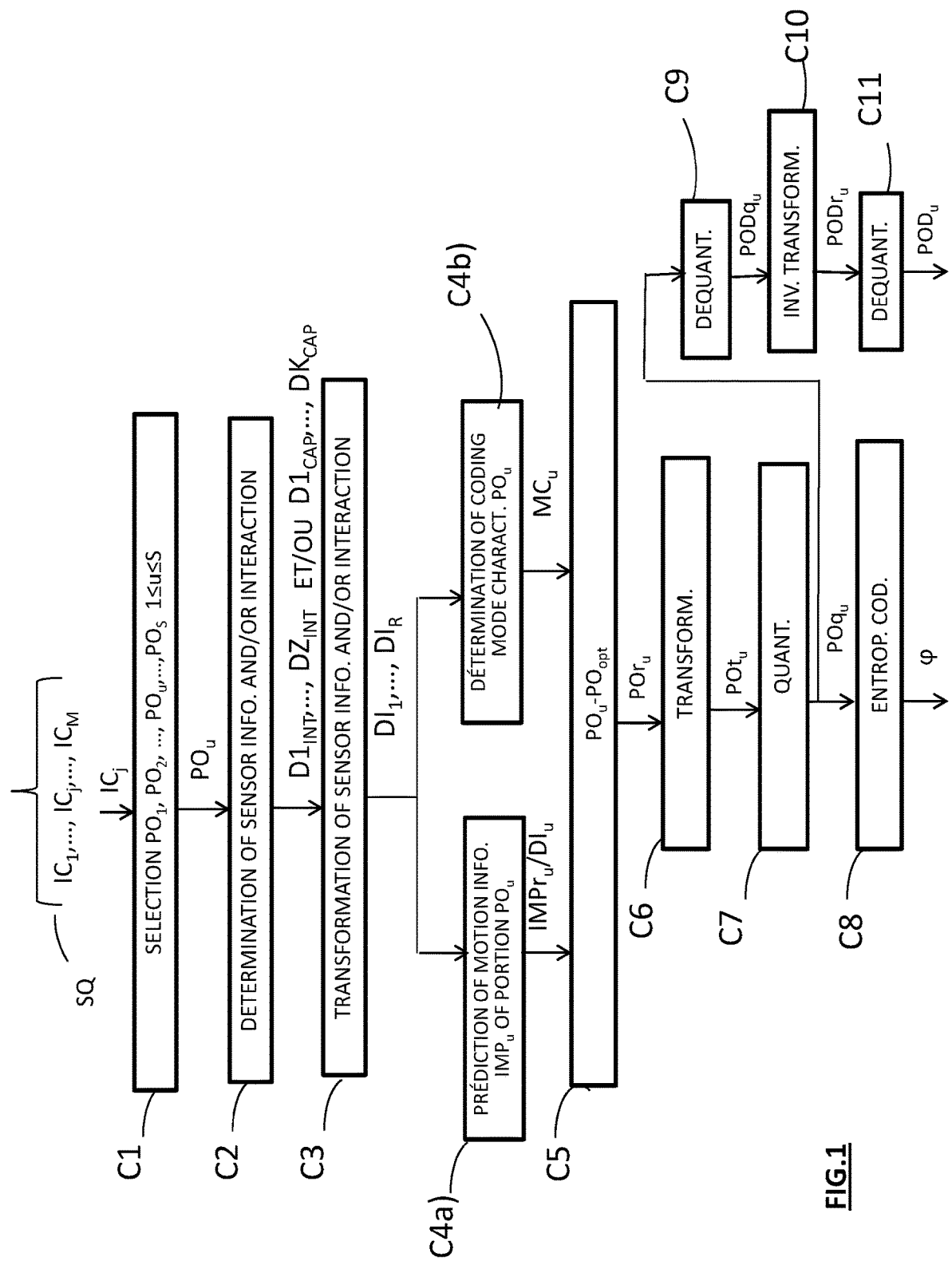
FIG. 1 represents the steps of the coding method according to the invention.

In this embodiment, the coding method according to the invention is for example implemented in software or hardware fashion by modifications to such a coder. The coding method according to the invention is represented in the form of an algorithm comprising steps C1 to C11 as represented in FIG. 1.

Figure 2:
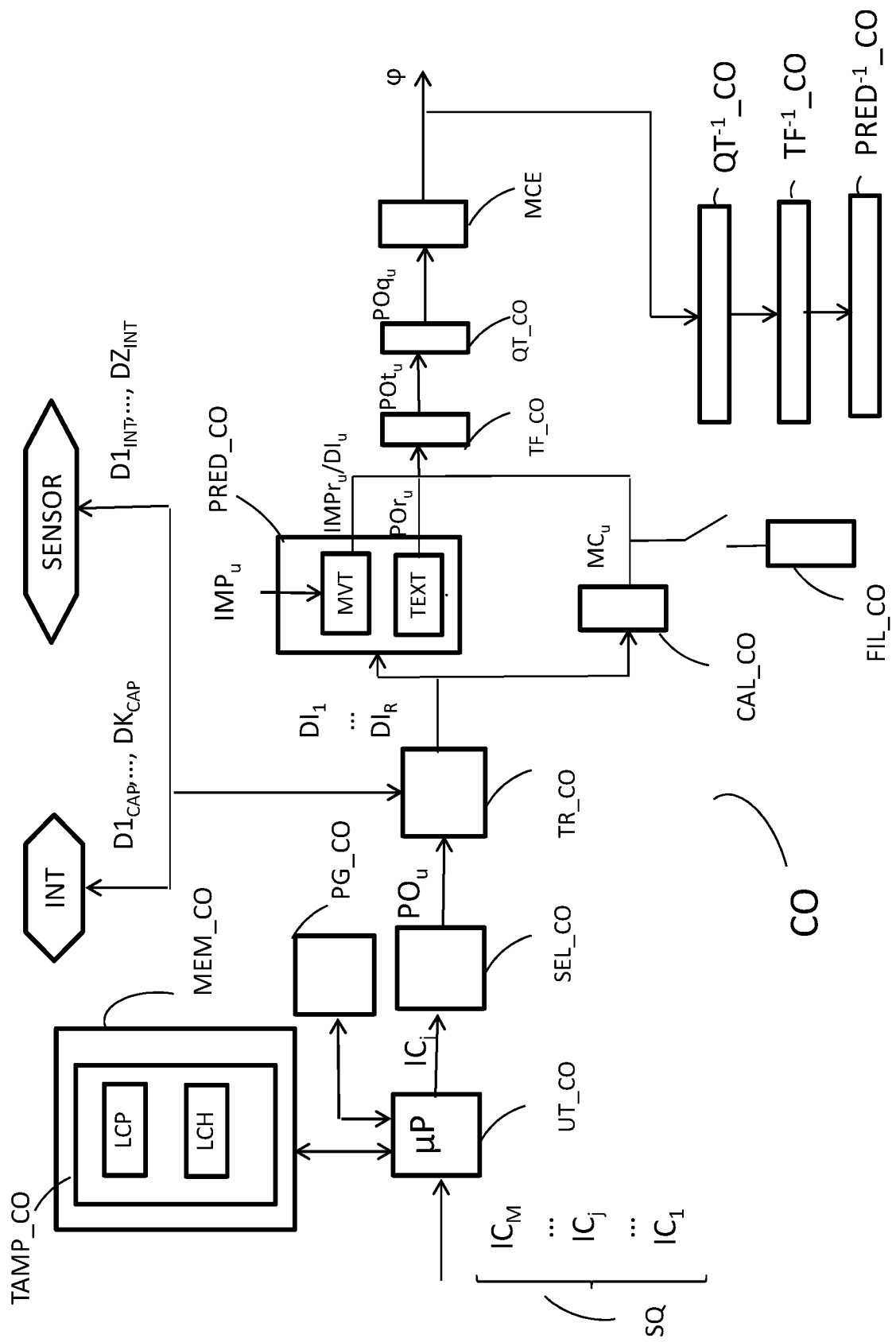
FIG. 2 represents an embodiment of a coding device according to the invention.

According to the embodiment of the invention, the coding method according to the invention is implemented in a coding device or coder CO represented in FIG. 2.

As illustrated in FIG. 2, such a coder comprises a memory MEM_CO comprising a buffer memory TAMP_CO, a processing unit UT_CO equipped for example with a microprocessor μP and driven by a computer program PG_CO which implements the coding method according to the invention. On initialization, the code instructions of the computer program PG_CO are for example loaded in a RAM memory (not represented) before being executed by the processor of the processing unit UT_CO.

Such a coder CO is installed in an image capture terminal (not represented) such as, for example, a portable telephone, a smartphone, a tablet, etc.

The coding method represented in FIG. 1 is applied to any current image $IC_j$ of a sequence SQ of images $IC_1, \ldots, IC_j, \ldots, IC_M$ ($1 \leq j \leq M$) to be coded which are captured by one of the abovementioned image capture terminals in which the coder CO is installed.

During a step C1 represented in FIG. 1, for a current image $IC_j$ concerned, a current portion $PO_u$ to be coded of the image $IC_j$ is selected from several portions $PO_1, PO_2, \ldots, PO_u, \ldots, POs$ of this image.

According to the invention, such a portion is for example:

a particular area of pixels of the image, such as, for example, an area of uniform texture, color or motion, a block of pixels of the image of predefined size in the case where the current image has been previously partitioned into blocks as for example in the AVC, H.264, HEVC, etc. standards.

The abovementioned step C1 is implemented by a software selection module SEL_CO represented in FIG. 2, which module is driven by the microprocessor μP of the processing unit UT_CO.

During a step C2 represented in FIG. 1, at least one information item relating to the manipulation of the abovementioned terminal by a user is determined, in relation to the captured current image $IC_j$.

The abovementioned step C2 is implemented by a software processing module TR_CO represented in FIG. 2, which module is driven by the microprocessor μP of the processing unit UT_CO.

According to a first current image capture context, such an information item is delivered by at least one data sensor installed in the abovementioned terminal. This information item is denoted $D1_{CAP}$. In the case where the image capture terminal contains a plurality of sensors, a plurality of information items $D1_{CAP}, D2_{CAP}, \ldots, DK_{CAP}$ ($K \geq 1$) is respectively delivered.

Nonlimiting examples of such information items include:

an acceleration (m/s$^2$) of the terminal according to three different axes, as measured by an accelerometer upon the capture of the current image, an angular position (rad/s) of the terminal according to one, two or three axes, as measured by a gyroscope upon the capture of the current image, the altitude, longitude and latitude (m) of the terminal, as measured by a GPS (Global Positioning System) receiver upon the capture of the current image, the angular position (degrees) of the terminal relative to the Earth's magnetic field, as measured by a compass, upon the capture of the current image, the magnetic field (Tesla) of the terminal, as measured by a magnetometer, upon the capture of the current image, the ambient brightness (Lux) measured by a brightness sensor, upon the capture of the current image, the motion (Faraday) of the user upon the capture of the current image, as measured by a proximity sensor, the brightness (Lux) measured by a backlit image sensor, upon the capture of the current image, etc.

According to a second current image capture context, such an information item is obtained following at least one action by the user on the image capture terminal, in relation to the captured current image. Such an action consists in interacting with the image capture terminal, via a physical or touch button of the terminal or else directly via the screen of the terminal, for example to perform a zoom in or a zoom out on the captured current image, the selection of an area of the captured current image in order to improve the quality thereof, etc.

According to this second context, the information item is denoted $D1_{INT}$. In the case where the user performs different actions in relation to the captured current image, different information items $D1_{INT}, D2_{INT}, \ldots, DZ_{INT}$ ($Z \geq 1$) are respectively obtained.

During a step C3 represented in FIG. 1, the processing module TR_CO proceeds with the transformation of the information item or items determined in the step C2 into a datum or into several data relating to the current image $IC_j$ which can be directly exploited by the coder CO. Such current image data are denoted $DI_1, DI_2, \ldots, DI_R$ ($R \geq 1$) in FIGS. 1 and 2.

According to the invention, the current image datum or data obtained in the step C3 is/are intended:

either to predict at least one motion information item $IMP_u$ associated with the current image portion $PO_u$, or to determine at least one characteristic of a coding mode $MC_u$ associated with the current image portion $PO_u$, such as, for example, an intra, inter, merge, etc. coding mode.

Such a prediction is implemented during a step C4a) represented in FIG. 1. The step C4a) is implemented by a software prediction module PRED_CO represented in FIG. 2, which module is driven by the microprocessor µP of the processing unit UT_CO.

Such a determination of at least one characteristic of a coding mode $MC_u$ is implemented during a step C4b) represented in FIG. 1. The step C4b) is implemented by a software computation module CAL_CO represented in FIG. 2, which module is driven by the microprocessor µP of the processing unit UT_CO.

Obviously, the steps C4a) and C4b) can equally well be implemented separately or together.

According to a first alternative of the step C4a), the module PRED_CO computes the difference between at least one of said current image data $DI_1, DI_2, \ldots, DI_R$ and the motion information item $IMP_u$ associated with the current image portion $PO_u$.

A motion information item residual $IMPr_u$ is then obtained on completion of the step C4a).

According to a second alternative of the step C4a), the module PRED_CO assigns by inheritance to the motion information item $IMP_u$ associated with the current image portion $PO_u$, at least one of said current image data $DI_1, DI_2, \ldots, DI_R$.

An inherited motion information item $DI_u$ ($1 \leq u \leq R$) is then obtained on completion of the step C4a).

According to a third alternative of the step C4a), at least one of said current image data $DI_1, DI_2, \ldots, DI_R$ is simply added to a list LCP of candidate predictive motion information items stored in the buffer memory TAMP_CO of FIG. 2.

Thus, during the step C4a), such a current image datum will if necessary be able to be selected from the list LCP by the prediction module PRED_CO, following a competing of the predictive motion information items of the list LCP, for example by minimization of a distortion bit rate criterion well known to those skilled in the art.

The list LCP is for example a list of motion predictors of the AMVP coding mode.

According to a fourth alternative of the step C4a), at least one of said current image data $DI_1, DI_2, \ldots, DI_R$ is simply added to a list LCH of motion information items that are candidates for inheritance, as stored in the buffer memory TAMP_CO of FIG. 2.

Thus, during the step C4a), such a current image datum will if necessary be able to be selected from the list LCH by the prediction module PRED_CO following a competing of the motion information items that are candidates for inheritance of the list LCH, for example by minimization of a distortion bit rate criterion well known to those skilled in the art.

The list LCH is for example a list of motion information items of the MERGE coding mode.

According to an example for which at least one current image datum is used for the purposes of motion information item prediction, such a current image datum is a motion information item $IMI_j$ associated with the current image $IC_j$.

The motion information item $IMP_u$ associated with the current image portion $PO_u$ and the motion information item $IMI_j$ associated with the current image obtained on completion of the step C3 are, for example, respectively a current motion vector $MV_u$ associated with the current image portion $PO_u$ and a motion vector $MV_j$ associated with the current image $IC_j$.

The motion vector $MV_j$ associated with the current image $IC_j$ has for example been obtained during the step C3 by association of a value of acceleration of the image capture terminal along an axis, for example a horizontal axis, as measured by an accelerometer installed in the terminal, with the time when the user captured the current image $IC_j$.

Alternatively, during the abovementioned step C3, several current image data instead of just one could be obtained. These different current image data constitute, for example, a matrix of motion vectors associated with different displacement values as measured for example by the accelerometer along the three axes X, Y and Z upon the capture of the current image, or even altitude and/or longitude and/or latitude variations between the current image ICj and the preceding image $IC_{j-1}$, as measured by the GPS receiver, upon the capture of the current image.

Various exemplary characteristic(s) of coding mode(s) determined during the step C4b) will now be described.

According to a first case of use, a characteristic of the coding mode $MC_u$ of the portion $PO_u$ of the current image is an accuracy of the motion of the current image portion determined in accordance with a value of accuracy of the motion of the current image having been associated previously with a motion information item value of the current image $IC_j$ by the processing module TR_CO of FIG. 2.

For example, the motion information item value of the current image $IC_j$ is the value of a motion vector $MV_j$ associated with the current image $IC_j$ as obtained for example during the abovementioned step C3 by association of a value of acceleration of the image capture terminal along an axis, for example a horizontal axis, as measured by an accelerometer installed in the terminal, with the time when the user captured the current image $IC_j$. The value of the motion vector thus obtained is indicative of the accuracy of the motion of the current image $IC_j$ and corresponds to a motion resolution of a given value, such as, for example, a motion vector resolution to within a $16^{th}$ of a pixel, to within an $8^{th}$ of a pixel, etc., to within a pixel.

According to a second case of use, a characteristic of the coding mode $MC_u$ of the portion $PO_u$ of the current image is a type of motion of the portion of the current image determined in accordance with motion parameters of the current image $IC_j$ which have been previously associated with at least one of said current image data $DI_1$, $DI_2$, ..., $DI_R$ by the processing module TR_CO of FIG. 2.

For example, such a current image datum is the value of a motion vector $MV_j$ associated with the current image $IC_j$ as obtained for example during the abovementioned step C3 by association of a value of acceleration of the image capture terminal along an axis, for example a horizontal axis, as measured by an accelerometer installed in the terminal, with the time when the user captured the current image $IC_j$. The value of the motion vector $MV_j$ is defined by two motion parameters which are the coordinates of this vector. The computation module CAL_CO of FIG. 2 then deduces therefrom that the motion of the current image $IC_j$ is of linear type and associates a characteristic of the coding mode $MC_u$ of the current image portion, the inter mode for example, with this linear type of motion.

As an alternative to this example, during the abovementioned step C3, several current image data instead of just one could be obtained. These various current image data constitute, for example, a matrix of motion vectors associated with different displacement values as measured for example by the accelerometer along the three axes X, Y and Z upon the capture of the current image, or even altitude and/or longitude and/or latitude variations between the current image ICj and the preceding image $IC_{j-1}$, as measured by the GPS receiver, upon the capture of the current image. If three motion vector values are obtained in association with, respectively, three accelerations on the axes X, Y and Z or with three altitude, longitude and latitude variations, these three values define six motion parameters. The computation module CAL_CO of FIG. 2 then deduces therefrom that the motion of the current image $IC_j$ is of affine type and determines that a characteristic of the coding mode $MC_u$ of the current image portion, the inter mode for example, is a motion of affine type.

According to a third case of use, a characteristic of the coding mode $MC_u$ of the current image portion $PO_u$ is an order of coding of the pixels of the portion of the current image determined in accordance with a type of order of coding of the pixels of the current image $IC_j$ which has been associated previously with at least one of said current image data $DI_1$, $DI_2$, ..., $DI_R$ by the processing module TR_CO of FIG. 2.

For example, such a current image datum is the value of a motion vector $MV_j$ associated with the current image $IC_j$ as obtained for example during the abovementioned step C3 by association of a value of acceleration of the image capture terminal along an axis, for example a vertical axis, as measured by an accelerometer installed in the terminal, with the time when the user captured the current image $IC_j$. The vertical direction of the vector $MV_j$ enables the computation module CAL_CO of FIG. 2 to deduce that a characteristic of the coding mode $MC_u$ of the current image portion is a vertical order of coding of the pixels of the current image portion $PO_u$.

According to a fourth case of use, a characteristic of the coding mode $MC_u$ of the current image portion $PO_u$ is a direction of prediction of the pixels of the portion of the current image determined in accordance with an angle value between the current image and an image preceding said current image, said angle value having been associated previously with at least one of said current image data $DI_1$, $DI_2$, ..., $DI_R$ by the processing module TR_CO of FIG. 2.

For example, such a current image datum is a direction of prediction of the intra coding mode associated with the current image $IC_j$ as obtained for example during the abovementioned step C3 by association of a value of angular variation between the current image $IC_j$ and an image $IC_{j-1}$ preceding the current image, as measured for example by a gyroscope installed in the image capture terminal, with the time when the user captured the current image. Such an intra prediction direction enables the computation module CAL_CO of FIG. 2 to deduce that a characteristic of the coding mode $MC_u$ of the current image portion is this intra prediction direction for the pixels of the current image portion $PO_u$.

According to a fifth case of use, a characteristic of the coding mode $MC_u$ of the current image portion $PO_u$ is an indicator of activation or of non-activation of a module for filtering the pixels of the portion of the current image determined as a function of a brightness value of the current image which has been previously associated with at least one of said current image data $DI_1$, $DI_2$, ..., $DI_R$ by the processing module TR_CO of FIG. 2.

A filtering module, denoted FIL_CO, is represented in FIG. 2. It is, for example, depending on the coding context used, an anti-block or de-blocking filter or else even a noise-reduction filter.

According to a first example, such a current image datum is an acceleration value measured by an accelerometer installed in the image capture terminal. Depending on the higher or lower value of this acceleration, the computation module CAL_CO triggers or does not trigger the activation of the filtering module FIL_CO, here an anti-block filter.

According to a second example, such a current image datum is an illumination value measured by an illumination sensor installed in the image capture terminal. Depending on the higher or lower value of this illumination value, the computation module CAL_CO of FIG. 2 triggers or does not trigger the activation of the filtering module FIL_CO. In particular, if the illumination value is low, thereby characterizing a dark area of the image, the activation of the filtering module FIL_CO, here a noise-reduction filter, is activated.

Obviously, the cases of use which have just been mentioned above can be combined so as to determine several coding mode characteristics associated with the current image portion $PO_u$.

During a step C5 represented in FIG. 1, the data relating to the current image portion $PO_u$ are compared to the data of an optimal predictive image portion $PO_{opt}$ which has been selected following a competing of predetermined coding modes, including in particular the coding modes according to the abovementioned first, second and fourth cases of use, such a selection being for example implemented by minimization of a distortion bit rate criterion well known to those skilled in the art. Such a step C5 is implemented by the prediction module PRED_CO represented in FIG. 2.

The image portion $PO_{opt}$ is considered to be an approximation of the current image portion $PO_u$.

More specifically, during this step, the difference between the optimal predictive image portion $PO_{opt}$ and the current image portion $PO_u$ is conventionally computed.

A residual image portion $POr_u$ is then obtained on completion of the step C5.

During a step C6 represented in FIG. 1, the residual image portion $POr_u$ is transformed according to a conventional direct transformation operation such as, for example, a discrete cosine transformation of DCT type or a wavelet transformation of DWT type, to produce a transformed image portion $POt_u$. Such an operation is performed by a transform software module TF_CO, as represented in FIG. 2, which module is driven by the microprocessor μP of the processing unit UT_CO.

During a step C7 represented in FIG. 1, the transformed image portion $POt_u$ is quantized according to a conventional quantization operation, such as, for example, a scalar or vector quantization. A set $POq_u$ of N×N quantized coefficients is then obtained, where N is an integer greater than or equal to 1. Such a step is performed by means of a software quantization module QT_CO as represented in FIG. 2, which module is driven by the microprocessor μP of the processing unit UT_CO.

During a step C8 represented in FIG. 1, the coefficients of the set $POq_u$ are coded according to a predetermined order which is for example the coding order determined according to the abovementioned third case of use in the case where this coding order has been selected as optimal following a competing with other coding orders, notably raster scan coding orders. In the preferred embodiment, the coding performed is an entropic coding of arithmetic or Huffman type. The step C8 then consists in:
 reading the symbol or symbols of a predetermined set of symbols which are associated with the current image portion $PO_u$,
 associating digital information items, such as bits, with the symbol(s) read.

Such an entropic coding step is implemented by a software entropic coding module MCE represented in FIG. 2, which module is driven by the microprocessor μP of the processing unit UT_CO. The entropic coding module MCE is for example of CABAC (Context Adaptive Binary Arithmetic Coder) type. It can also be a Huffman coder known per se.

On completion of the entropic coding step C8, a data signal φ which contains the set of quantized coefficients $POq_u$ is then delivered. Such a signal is then transmitted by a communication network (not represented) to a remote terminal. The latter comprises the decoder DO represented in FIG. 4.

Particularly advantageously, in the case where a prediction of the motion of the current image portion $PO_u$ has been performed from at least one of said current image data $DI_1$, $DI_2$, ..., $DI_R$:
 if a motion information item residual $IMPr_u$ is obtained on completion of the step C4a), only the latter is signaled in the signal φ and not the index associated with the at least one of said current image data $DI_1$, $DI_2$, ..., $DI_R$ used for the prediction,
 if a motion information item $DI_u$ is obtained by inheritance on completion of the step C4a), the latter is not signaled in the signal φ.

Equally advantageously, in the case where one or more coding mode characteristics $MC_u$, as determined from at least one of said current image data $DI_1$, $DI_2$, ..., $DI_R$ following the step C4b), have been selected to code the current image portion $PO_u$, these coding mode characteristics are not directly signaled in the signal φ.

According to a first embodiment, the signal φ directly contains the information item or items relating to the manipulation of the terminal determined in the abovementioned step C2. Such information items are for example indicated in the sequence SQ of images, each using a flag which:
 is set to 0 to indicate to the decoder that these information items or some of them have not been used in the coding of the current image portion $PO_u$,
 is set to 1 to indicate to the decoder that these information items or some of them have been used in the coding of the current image portion $PO_u$.

In the case where such information items have been used for the coding of the current image portion $PO_u$, the value of these information items is signaled in the portion of the signal φ which corresponds to the encoded data of the current portion $PO_u$ of the current image $IC_j$.

In the example represented in FIG. 3A, it is assumed that three information items relating to the manipulation of the terminal are likely to be used for the coding of the current image portion $PO_u$. They are for example an acceleration value ACC, an illumination value ILL and a zoom-in value Z+. If, for example, the acceleration value and the zoom-in value have been used by the coder CO, the flags $FG_1$ and $FG_3$ associated respectively with each of these values are set to 1. The flag $FG_2$ associated with the illumination value is, for its part, set to 0. The portion of the signal φ which corresponds to the encoded data of the current image portion $PO_u$ contains, in this case, the value Vi of acceleration ACC and the value $V_3$ of zoom-in Z+.

According to a second embodiment, the signal φ contains the current image datum or data $DI_1$, $DI_2$, ..., $DI_R$ obtained in the abovementioned step C3, by transformation of the information item or items relating to the manipulation of the terminal. Such data are for example indicated in the sequence SQ of images, each using a flag which:
 is set to 0 to indicate to the decoder that these data or some of them have not been used in the coding of the current image portion $PO_u$,
 is set to 1 to indicate to the decoder that these data or some of them have been used in the coding of the current image portion $PO_u$.

In the case where such data have been used for the coding of the current image portion $PO_u$, the value of these data is signaled in the portion of the signal φ which corresponds to the encoded data of the current portion $PO_u$ of the current image $IC_j$.

In the example represented in FIG. 3B, it is assumed that three current image data $DI_1$, $DI_2$, $DI_3$ are likely to be used for the coding of the current image portion $PO_u$. They are for example:
 a motion vector value $V'_1$ obtained after transformation of an acceleration value measured by an accelerometer installed in the image capture terminal,
 an intra prediction index value $V'_2$ obtained after transformation of an angle value between the current image and the preceding image, as measured by a gyroscope installed in the image capture terminal,
 an index value $V'_3$ of activation of the filtering module FIL_CO of FIG. 2, as obtained after transformation of a brightness value measured by an illumination sensor installed in the image capture terminal.

To this end, in the sequence of images SQ, the flags $FG'_1$, $FG'_2$ and $FG'_3$ associated respectively with each of the current image data $DI_1$, $DI_2$, $DI_3$ are set to 1, whereas the flags $FG'_4$ to $FG'_R$ associated respectively with each of the current image data $DI_4$ to $DI_R$ are set to 0. The portion of the signal φ which corresponds to the encoded data of the current image portion $PO_u$ in this case contains the abovementioned values $V'_1$, $V'_2$, $V'_3$.

During a step C9 represented in FIG. 1, the set of coefficients $POq_u$ is dequantized according to a conventional dequantization operation, which is the inverse operation of the quantization performed in the step C7. A set of dequantized coefficients $PODq_u$ is then obtained.

Such a dequantization step is performed by a software inverse quantization module $QT^{-1}\_CO$, as represented in FIG. 2, which module is driven by the microprocessor μP of the processing unit UT_CO.

During a step C10 represented in FIG. 1, the inverse transformation of the set of dequantized coefficients $PODq_u$, which is the inverse operation of the direct transformation performed in the abovementioned step C6, is performed. A decoded residual image portion $PODr_u$ is then obtained.

Such an operation is performed by a software inverse transform module $TF^{-1}\_CO$, as represented in FIG. 2, which module is driven by the microprocessor μP of the processing unit UT_CO.

During a step C11 represented in FIG. 1, the decoded current image portion $POD_u$ is constructed by adding to the optimal predictive image portion $PO_{opt}$ used in the abovementioned step C5 the decoded residual image portion $PODr_u$. It should be noted that this decoded current image portion $POD_u$ is the same as the decoded image portion obtained on completion of the method for decoding the image $IC_j$ which will be described later in the description.

Such a step is implemented by a software inverse predictive coding module $PRED^{-1}\_CO$ represented in FIG. 2, which module is driven by the microprocessor μP of the processing module UT_CO.

During the abovementioned step C11, in the case where the first alternative of the abovementioned step C4a) has been implemented, the decoded motion information item $IMPD_u$ is also constructed by adding, to the at least one of said data $DI_1, DI_2, \ldots, DI_R$ of the current image used in the prediction of the motion information item $IMP_u$ associated with the current image portion $PO_u$, the motion information item residual $IMPr_u$ obtained on completion of the abovementioned step C4a).

The coding steps which have just been described above are then implemented for each of the portions $PO_1$, $PO_2, \ldots, PO_u, \ldots$, POs to be coded of the current image $IC_j$ concerned.

Detailed Description of the Decoding Part

Figure 5:
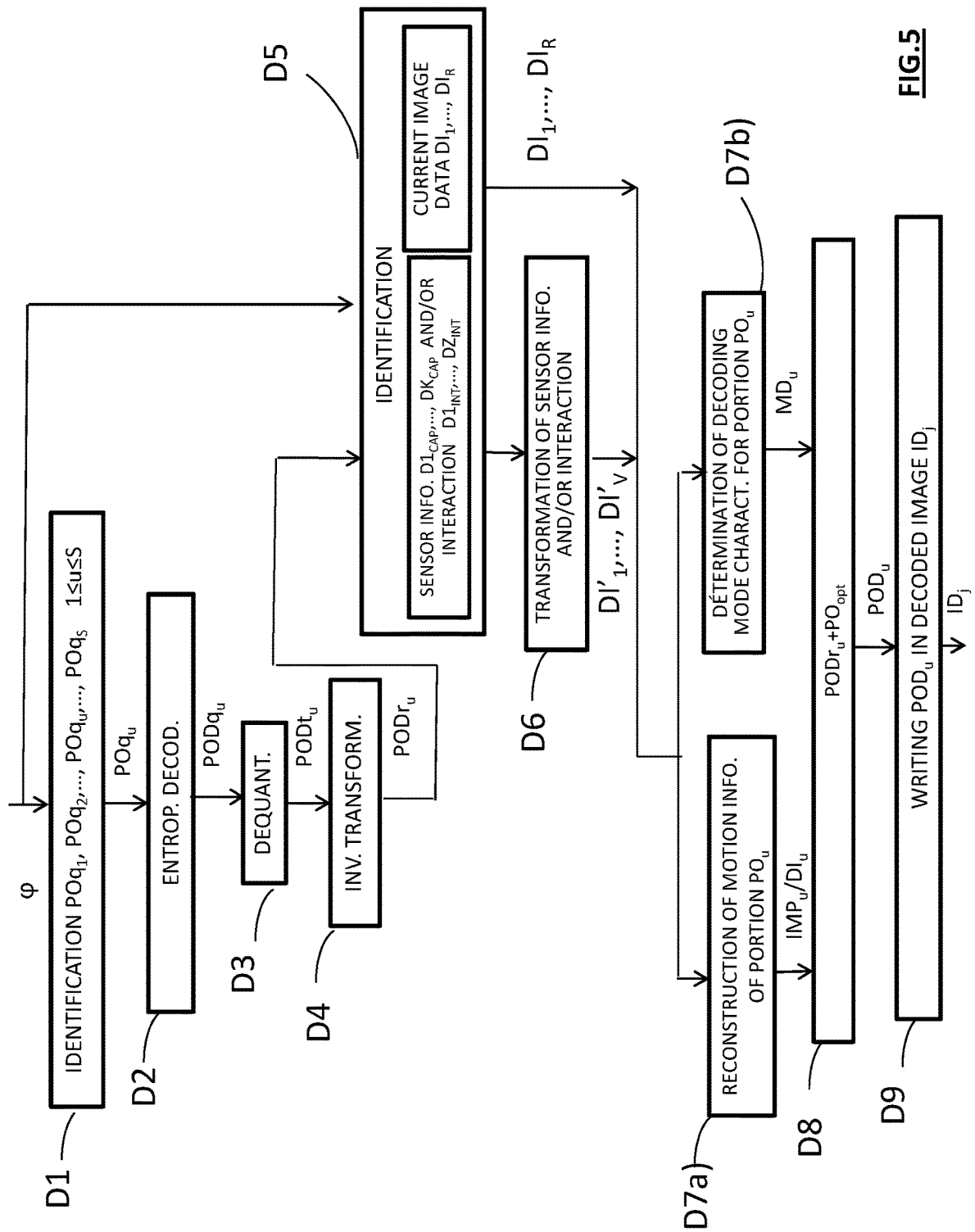
FIG. 5 represents the steps of the decoding method according to the invention.

An embodiment of the decoding method according to the invention will now be described, in which the decoding method is implemented in software or hardware fashion by modifications to a decoder initially conforming to any one of the current or future video decoding standards. The decoding method according to the invention is represented in the form of an algorithm comprising steps D1 to D9 as represented in FIG. 5.

Figure 4:
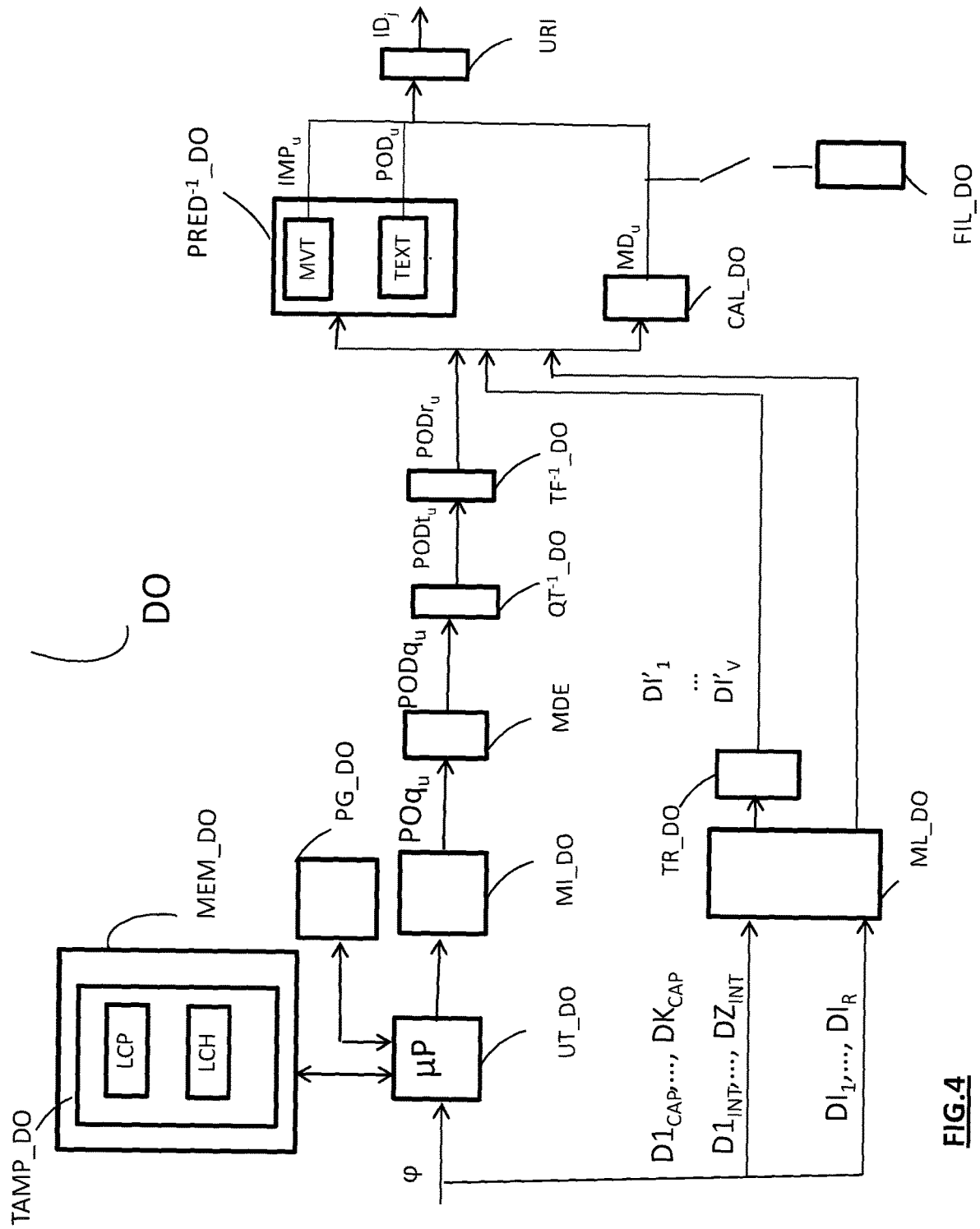
FIG. 4 represents an embodiment of a decoding device according to the invention.

According to the embodiment of the invention, the decoding method according to the invention is implemented in a decoding device or decoder DO represented in FIG. 4.

As illustrated in FIG. 4, the decoder DO according to this embodiment of the invention comprises a memory MEM_DO comprising a buffer memory TAMP_DO, a processing unit UT_DO equipped for example with a microprocessor μP and driven by a computer program PG_DO which implements the decoding method according to the invention. On initialization, the code instructions of the computer program PG_DO are for example loaded into a RAM memory (not represented) before being executed by the processor of the processing unit UT_DO.

Such a decoder DO is installed in an image display terminal (not represented) such as, for example, a television receiver, a portable telephone, a smartphone, a tablet, etc.

The decoding method represented in FIG. 5 is applied to any current image $IC_j$ of a sequence SQ of images $IC_1, \ldots, IC_j, \ldots, IC_M$ ($1 \leq j \leq M$) to be decoded which have been captured by one of the abovementioned image capture terminals in which the coder CO is installed, then coded thereby.

To this end, information items representative of the current image $IC_j$ to be decoded are identified in a data signal φ received on the decoder, as delivered following the coding method of FIG. 1.

Referring to FIG. 5, during a step D1, sets of quantized coefficients $POq_1, POq_2, \ldots, POq_u, \ldots$ POqs ($1 \leq u \leq S$) associated respectively with the portions $PO_1, PO_2, \ldots, PO_u, \ldots$, POs of the current image $IC_j$ which have been coded previously in accordance with the coding method of FIG. 1 are identified in said signal φ.

Such an identification step is implemented by a software signal analysis identification module MI_DO, as represented in FIG. 4, said module being driven by the microprocessor μP of the processing unit UT_DO.

During this step, the identification module MI_DO identifies, for a current image portion $PO_u$ to be reconstructed:
- the type of coding mode (intra, inter, merge, etc.) which has been used for this current image portion,
- the index of the optimal predictive image portion $PO_{opt}$ which has been selected in the abovementioned step C5,
- the motion information item residual $IMPr_u$ if a motion prediction has been implemented in accordance with the first alternative of the abovementioned step C4a).

For a set of quantized coefficients concerned $POq_u$ associated with the current image portion to be reconstructed $PO_u$, the entropic decoding of this set of coefficients is carried out during a step D2 represented in FIG. 5. In the preferred embodiment, such an entropic decoding is of arithmetic or Huffman type. The step D2 then consists in:
- reading the symbol or symbols of the predetermined set of symbols which are associated with the current image portion $PO_u$ to be reconstructed,
- associating digital information items, such as bits, with the symbol(s) read.

On completion of this step D2, a set of decoded quantized coefficients $PODq_u$ is obtained.

Such an entropic decoding step is implemented by a software entropic decoding module MDE represented in FIG. 4, which module is driven by the microprocessor μP of the processing unit UT_DO. The entropic decoding module MDE is for example of CABAC type. It can also be a Huffman decoder known per se.

During a step D3 represented in FIG. 5, the set of decoded quantized coefficients $PODq_u$ is dequantized according to a conventional dequantization operation, which is the inverse operation of the quantization step performed in the step C7 of FIG. 1. A decoded dequantized image portion $PODt_u$ is then obtained.

Such a dequantization step is performed by a software inverse quantization module $QT^{-1}\_DO$, as represented in FIG. 4, which module is driven by the microprocessor μP of the processing unit UT_DO.

During a step D4 represented in FIG. 5, the inverse transformation of the decoded dequantized image portion $PODt_u$ is performed, which is the inverse operation of the transformation performed in the step C6 of FIG. 1. A current decoded residual image portion $PODr_u$ is then obtained.

Such an operation is performed by a software inverse transform module $TF^{-1}\_DO$, as represented in FIG. 4, which module is driven by the microprocessor μP of the processing unit UT_DO.

During a step D5 represented in FIG. 5, there is carried out, according to the invention, an identification in the signal φ:
either of at least one information item relating to the manipulation of the abovementioned image capture terminal, in relation to the current image $IC_j$ to be reconstructed, such an information item forming part of the abovementioned sensor information items $D1_{CAP}$, $D2_{CAP}$, ..., $DK_{CAP}$ and/or of the abovementioned user interaction information items $D1_{INT}$, $D2_{INT}$, ..., $DZ_{INT}$,
or of at least one of said abovementioned current image data $DI_1, DI_2, \ldots, DI_R$.

Such an identification is implemented by a software reading module ML_DO, as represented in FIG. 4, which module is driven by the microprocessor μP of the processing unit UT_DO.

If it is one or more information items relating to the manipulation of the image capture terminal which are identified in the step D5, during a step D6 represented in FIG. 5, a processing module TR_DO represented in FIG. 4 proceeds with the transformation of these information items into a datum or several data relating to the current image $IC_j$ which is/are directly usable by the decoder DO, such current image data being denoted $DI'_1, DI'_2, \ldots, DI'_V$ ($V \geq 1$) in FIGS. 4 and 5.

According to the invention, the current image datum or data identified in the step D5 or obtained in the step D6 are intended:
either to reconstruct, by motion prediction, at least one motion information item $IMP_u$ associated with the current image portion $PO_u$,
or to determine at least one characteristic of a decoding mode $MD_u$ associated with the current image portion $PO_u$ and corresponding to the coding mode $MC_u$ identified in the abovementioned step D1.

Such a reconstruction by motion prediction is implemented during a step D7a) represented in FIG. 5. The step D7a) is implemented by a software inverse prediction module $PRED^{-1}\_DO$ represented in FIG. 4, which module is driven by the microprocessor μP of the processing unit UT_DO.

Such a determination of at least one characteristic of a decoding mode $MD_u$ is implemented during a step D7b) represented in FIG. 5. The step D7b) is implemented by a software computation module CAL_DO represented in FIG. 4, which module is driven by the microprocessor μP of the processing unit UT_DO.

Obviously, the steps D7a) and D7b) can equally well be implemented separately or in combination.

According to a first alternative of the step D7a), the module $PRED^{-1}\_DO$ reconstructs the motion information item $IMP_u$ associated with the current image portion $PO_u$ by adding, to the motion information item residual $IMPr_u$ identified in the signal φ in step D1, at least one of said current image data $DI_1, DI_2, \ldots, DI_R$ as identified in the step D5 or at least one of the current image data $DI'_1$, $DI'_2, \ldots, DI'_V$ as obtained in the step D6.

According to a second alternative of the step D7a), the module $PRED^{-1}\_DO$ assigns by inheritance to the motion information item $IMP_u$ associated with the current image portion $PO_u$ to be reconstructed at least one of said current image data $DI_1, DI_2, \ldots, DI_R$ identified in the step D5 or at least one of the current image data $DI'_1, DI'_2, \ldots, DI'_V$ obtained in the step D6.

An inherited motion information item $DI_u$ ($1 \leq u \leq R$ and $1 \leq u \leq V$) is then obtained on completion of the step D7a).

According to a third alternative of the step D7a), at least one of said current image data $DI_1, DI_2, \ldots, DI_R$ identified in the step D5 or at least one of the current image data $DI'_1$, $DI'_2, \ldots, DI'_V$ obtained in the step D6 is simply added to a list LCP of candidate predictive motion information items stored in the buffer memory TAMP_DO of FIG. 4.

Thus, during the step D7a), such a current image datum will if necessary be able to be selected from the list LCP by the prediction module $PRED^{-1}\_DO$, following a competing of the predictive motion information items of the list LCP.

The list LCP is for example a list of motion predictors of the AMVP decoding mode.

According to a fourth alternative of the step D7a), at least one of said current image data $DI_1, DI_2, \ldots, DI_R$ identified in the step D5 or at least one of the current image data $DI'_1$, $DI'_2, \ldots, DI'_V$ obtained in the step D6 is simply added to a list LCH of motion information items that are candidates for inheritance, as stored in the buffer memory TAMP_DO of FIG. 4.

Thus, during the step D7a), such a current image datum will if necessary be able to be selected from the list LCH by the prediction module $PRED^{-1}\_DO$.

The list LCH is for example a list of motion information items of the MERGE decoding mode.

According to an example for which at least one current image datum is used for the purposes of reconstruction of the motion information item by motion prediction, such a current image datum is a motion information item $IMI_j$ associated with the current image $IC_j$.

The motion information item $IMP_u$ associated with the current image portion $PO_u$ to be reconstructed and the motion information item $IMI_j$ associated with the current image identified in the step D5 or obtained on completion of the step D6 are, for example, respectively a current motion vector $MV_u$ associated with the current image portion $PO_u$ to be reconstructed and a motion vector $MV_j$ associated with the current image $IC_j$.

Different examples of decoding mode characteristics determined during the step D7b) will now be described.

According to a first case of use, a characteristic of the decoding mode $MD_u$ of the portion of the current image $PO_u$ to be reconstructed is an accuracy of the motion of the current image portion to be reconstructed determined in accordance with a value of accuracy of the motion of the current image which is associated:
either with a motion information item value of the current image $IC_j$ identified directly in the signal φ in the step D5,
or with a motion information item value of the current image $IC_j$ determined in the step D6.

For example, the motion information item value of the current image $IC_j$ is the value of a motion vector $MV_j$ associated with the current image $IC_j$ as obtained for example during the abovementioned step C3 by association of a value of acceleration of the image capture terminal along an axis, for example a horizontal axis, as measured by an accelerometer installed in the terminal, with the time when the user captured the current image $IC_j$. The value of the motion vector thus obtained is indicative of the accuracy of the motion of the current image $IC_j$ and corresponds to a motion resolution of a given value, such as, for example, a motion vector resolution to within 1/16 of a pixel, to within 1/8 of a pixel, etc., to within a pixel.

According to a second case of use, a characteristic of the decoding mode $MD_u$ of the portion of the current image $PO_u$ to be reconstructed is a type of motion of the portion of the current image to be reconstructed determined in accordance with motion parameters of the current image $IC_j$ which have been associated:
- either with a motion information item value of the current image $IC_j$ identified directly in the signal φ in the step D5,
- or with a motion information item value of the current image $IC_j$ determined in the step D6.

For example, such a current image datum is the value of a motion vector $MV_j$ associated with the current image $IC_j$ as obtained for example during the abovementioned step C3 by association of a value of acceleration of the image capture terminal along an axis, for example a horizontal axis, as measured by an accelerometer installed in the terminal, with the time when the user captured the current image $IC_j$. The value of the motion vector $MV_j$ is defined by two motion parameters which are the coordinates of this vector. The computation module CAL_DO then deduces therefrom that the motion of the current image $IC_j$ is of linear type and associates a characteristic of the decoding mode $MD_u$ of the current image portion, the inter mode for example, with this linear type of motion.

As an alternative to this example, during the abovementioned step C3, several current image data instead of just one could be obtained. These different current image data constitute, for example, a matrix of motion vectors associated with different displacement values as measured for example by the accelerometer along the three axes X, Y and Z upon the capture of the current image, or even altitude and/or longitude and/or latitude variations between the current image ICj and the preceding image $IC_{j-1}$, as measured by the GPS receiver, upon the capture of the current image. If three motion vector values are obtained in association with, respectively, three accelerations on the axes X, Y and Z or with three altitude, longitude and latitude variations, these three values define six motion parameters. The computation module CAL_DO then deduces therefrom that the motion of the current image $IC_j$ is of affine type and determines that a characteristic of the decoding mode $MD_u$ of the current image portion to be reconstructed, the inter mode for example, is a motion of affine type.

According to a third case of use, a characteristic of the decoding mode $MD_u$ of the current image portion $PO_u$ to be reconstructed is an order of decoding of the pixels of the portion of the current image in accordance with a type of order of decoding of the pixels of the current image $IC_j$ which has been associated:
- either with a motion information item value of the current image $IC_j$ identified directly in the signal φ in the step D5,
- or with a motion information item value of the current image $IC_j$ determined in the step D6.

For example, such a current image datum is the value of a motion vector $MV_j$ associated with the current image $IC_j$ as obtained for example during the abovementioned step C3 by association of a value of acceleration of the image capture terminal along an axis, for example a vertical axis, as measured by an accelerometer installed in the terminal, with the time when the user captured the current image $IC_j$. The vertical direction of the vector $MV_j$ enables the computation module CAL_DO to deduce that a characteristic of the decoding mode $MD_u$ of the current image portion to be reconstructed is a vertical order of decoding of the pixels of the portion $PO_u$ of the current image to be reconstructed.

According to a fourth case of use, a characteristic of the decoding mode $MD_u$ of the current image portion $PO_u$ to be reconstructed is a direction of prediction of the pixels of the portion of the current image determined in accordance with an angle value between the current image and an image preceding said current image, said angle value having been associated:
- either with a motion information item value of the current image $IC_j$ identified directly in the signal φ in the step D5,
- or with a motion information item value of the current image $IC_j$ determined in the step D6.

For example, such a current image datum is a direction of prediction of the intra decoding mode associated with the current image $IC_j$ as obtained for example during the abovementioned step C3 by association of an angular variation value between the current image $IC_j$ and an image $IC_{j-1}$ preceding the current image, as measured for example by a gyroscope installed in the image capture terminal, with the time when the user captured the current image. Such an intra direction of prediction enables the computation module CAL_DO to deduce that a characteristic of the decoding mode $MD_u$ of the current image portion to be reconstructed is this intra direction of prediction for the pixels of the current image portion $PO_u$ to be reconstructed.

According to a fifth case of use, a characteristic of the decoding mode $MD_u$ of the current image portion $PO_u$ to be reconstructed is an indicator of activation or of non-activation of a module for filtering the pixels of the portion of the current image to be reconstructed determined as a function of a brightness value of the current image which has been associated:
- either with at least one of said current image data $DI_1, DI_2, \ldots, DI_R$ identified in the abovementioned step D5,
- or with at least one of said current image data $DI'_1, DI'_2, \ldots, DI'_R$ determined in the abovementioned step D6.

A filtering module, denoted FIL_DO, is represented in FIG. 4. It is, for example, depending on the decoding context used, an anti-block or de-blocking filter or else even a noise-reduction filter.

According to a first example, such a current image datum is an acceleration value measured by an accelerometer installed in the image capture terminal and indicated by a flag set to 1 in the signal φ. The computation module CAL_DO then triggers the activation of the filtering module FIL_DO, here an anti-block filter. On the other hand, if the flag corresponding to this acceleration value is set to 0, the computation module CAL_DO does not trigger the activation of the filtering module FIL_DO.

According to a second example, such a current image datum is a brightness value measured by an illumination sensor installed in the image capture terminal and indicated by a flag set to 1 in the signal φ. The computation module CAL_DO then triggers the activation of the filtering module FIL_DO. On the other hand, if the flag corresponding to this brightness value is set to 0, the computation module CAL_DO does not trigger the activation of the filtering module FIL_DO.

Obviously, the cases of use which have just been mentioned above can be combined so as to determine several decoding mode characteristics associated with the current image portion $PO_u$.

During a step D8 represented in FIG. 5, the current image portion $PO_u$ is reconstructed by adding, to the current decoded residual image portion $PODr_u$, as obtained on completion of the step D4, an optimal predictive image portion $PO_{opt}$, the index of which has been identified in the signal φ in the step D1. A decoded current image portion $POD_u$ is then obtained.

Such a step D8 is implemented by the prediction module $PRED^{-1}\_DO$ represented in FIG. 4.

During a step D9 represented in FIG. 5, said decoded current image portion $POD_u$ is written in the decoded current image $ID_j$.

Such a step is implemented by a software image reconstruction module URI as represented in FIG. 4, said module being driven by the microprocessor μP of the processing module UT_DO.

The decoding steps which have just been described above are then implemented for each of the portions $PO_1$, $PO_2$, ..., $PO_u$, ..., POs to be reconstructed of the current image $IC_j$ concerned.

An exemplary embodiment of the invention remedies drawbacks of the abovementioned prior art.

It goes without saying that the embodiments which have been described above have been given in a purely indicative and non-limiting manner, and that many modifications can easily be made by those skilled in the art without in any way departing from the scope of the invention.

The invention claimed is:

1. A method comprising:
coding at least one current image by implementing, on an image capture terminal, for at least one portion to be coded of the current image, acts comprising:
   determining an information item relating to a manipulation of the terminal by a user, in relation to said at least one captured current image,
   obtaining at least one datum relating to the current image by transformation of said determined information item,
   determining a coding mode associated with said at least one portion of the current image, according to said at least one obtained datum relating to the current image, said coding mode being an accuracy of the motion of said at least one portion of the current image, said accuracy being determined in accordance with a value of accuracy of the motion of the current image having been previously associated with a value of a motion information item of the current image.

2. The coding method as claimed in claim 1, further comprising:
generating a data signal containing the encoded data of the portion of the current image,
inserting into the data signal either the information item relating to the manipulation of the terminal, or the datum relating to the current image which has been obtained by transformation of the information item relating to the manipulation of the terminal.

3. A device for coding at least one current image which is able to be installed in an image capture terminal, wherein the device comprises, for at least one portion to be coded of the current imager:
a non-transitory computer-readable medium comprising instructions stored thereon;
a processor configured by the instructions to perform acts comprising:
   determining an information item relating to the manipulation of the terminal by a user, in relation to said at least one captured image,
   obtaining at least one datum relating to the current image by transformation of said determined datum,
   determining a coding mode associated with said at least one portion of the current image, according to said at least one obtained datum relating to the current image, said coding mode being an accuracy of the motion of said at least one portion of the current image, said accuracy being determined in accordance with a value of accuracy of the motion of the current image having been previously associated with a value of a motion information item of the current image.

4. A non-transitory computer-readable medium comprising instructions stored thereon for implementing a coding method when the instructions are run on a computer of an image capture terminal, wherein the instructions configure the image capture terminal to perform acts comprising:
coding at least one current image by implementing, for at least one portion to be coded of the current image, acts comprising:
   determining an information item relating to a manipulation of the terminal by a user, in relation to said at least one captured current image,
   obtaining at least one datum relating to the current image by transformation of said determined information item,
   determining a coding mode associated with said at least one portion of the current image, according to said at least one obtained datum relating to the current image, said coding mode being an accuracy of the motion of said at least one portion of the current image, said accuracy being determined in accordance with a value of accuracy of the motion of the current image having been previously associated with a value of a motion information item of the current image.

5. A method comprising:
decoding a data signal representative of at least one current image by implementing on an image display terminal, for at least one portion to be reconstructed of the current image, acts comprising:
   identifying, in the signal, either an information item relating to a manipulation of the terminal by a user, in relation to said at least one captured current image, or a datum relating to the current image obtained previously by transformation of said information item relating to the manipulation of the terminal,
   if said information item relating to the manipulation of the terminal is identified, determining at least one datum relating to the current image by transformation of said identified information item,
   determining a decoding mode associated with said at least one portion of the current image according to said identified datum relating to the current image or said at least one determined datum relating to the current image, said decoding mode being an accuracy of the motion of said at least one portion of the current image, said accuracy being determined in accordance with a value of accuracy of the motion of the current image having been previously associated with a value of a motion information item of the current image.

6. The decoding method as claimed in claim 5, during which said identified datum or said at least determined datum is a motion information item associated with the current image.

7. The decoding method as claimed in claim 5, during which at least one characteristic of a decoding mode for the portion of the current image is a type of motion of the portion of the current image determined in accordance with motion parameters of the current image which have been previously associated with said identified datum or said at least one determined datum.

8. The decoding method as claimed in claim 5, in which at least one characteristic of a decoding mode for the portion of the current image is an order for decoding of the pixels of the portion of the current image is determined in accordance with a type of order for decoding of the pixels of the current image which has been previously associated with said identified datum or said at least one determined datum.

9. The decoding method as claimed in claim 5, during which at least one characteristic of a decoding mode for the portion of the current image is a direction of prediction of the pixels of the portion of the current image determined in accordance with an angle value between the current image and an image preceding said current image, said angle value having been previously associated with said identified datum or said at least one determined datum.

10. The decoding method as claimed in claim 5, in at least one characteristic of a decoding mode for the portion of the current image is an indicator of activation or of non-activation of a module for filtering the pixels of the portion of the current image is determined as a function of a brightness value of the current image which has been previously associated with said identified datum relating or said at least one determined datum.

11. A device for decoding a data signal representative of at least one current image, said device being able to be installed in an image display terminal, wherein the device comprises, for at least one portion to be reconstructed of the current image:
 a non-transitory computer-readable medium comprising instructions stored thereon;
 a processor configured by the instructions to perform acts comprising:
  identifying, in the signal, either an information item relating to the manipulation of the terminal by a user, in relation to said at least one captured current image, or a datum relating to the current image obtained previously by transformation of said information item relating to the manipulation of the terminal,
  determining, if said information item relating to the manipulation of the terminal is identified, at least one datum relating to the current image by transformation of said identified information item,
  determining a decoding mode associated with said at least one portion of the current image according to said datum relating to the current image or said at least one determined datum relating to the current image, said decoding mode being an accuracy of the motion of said at least one portion of the current image, said accuracy being determined in accordance with a value of accuracy of the motion of the current image having been previously associated with a value of a motion information item of the current image.

12. A non-transitory computer-readable medium comprising instructions stored thereon for implementing a decoding method when the instructions are run on a computer of an image display terminal, wherein the instructions configure the image display terminal to perform acts comprising:
 decoding a data signal representative of at least one current image by implementing, for at least one portion to be reconstructed of the current image, acts comprising:
  identifying, in the signal, either an information item relating to a manipulation of the terminal by a user, in relation to said at least one captured current image, or a datum relating to the current image obtained previously by transformation of said information item relating to the manipulation of the terminal,
  if said information item relating to the manipulation of the terminal is identified, determining at least one datum relating to the current image by transformation of said identified information item,
  determining a decoding mode associated with said at least one portion of the current image according to said datum relating to the current image or said at least one determined datum relating to the current image, said decoding mode being an accuracy of the motion of said at least one portion of the current image, said accuracy being determined in accordance with a value of accuracy of the motion of the current image having been previously associated with a value of a motion information item of the current image.

* * * * *